(12) United States Patent
Howard et al.

(10) Patent No.: US 6,457,111 B1
(45) Date of Patent: Sep. 24, 2002

(54) METHOD AND SYSTEM FOR ALLOCATION OF A PERSISTENCE INDICATOR FOR AN OBJECT IN AN OBJECT-ORIENTED ENVIRONMENT

(75) Inventors: John Day Howard, Austin; Kean G. Kuiper, Round Rock; Frank Eliot Levine, Austin; William Robert Reynolds, Austin; Robert J. Urquhart, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,774

(22) Filed: Dec. 14, 1999

(51) Int. Cl.$^7$ ............................................. G06F 12/00
(52) U.S. Cl. ...................... 711/170; 711/154; 711/168; 707/206
(58) Field of Search ................................. 707/103, 206; 709/315; 711/170, 154, 168; 717/1, 11

(56) References Cited

U.S. PATENT DOCUMENTS

| | | | |
|---|---|---|---|
| 5,460,774 A | 10/1995 | Joy | 707/103 |
| 5,692,183 A * | 11/1997 | Hapner et al. | 707/103 |
| 5,724,575 A | 3/1998 | Hoover et al. | 395/610 |
| 5,870,753 A * | 2/1999 | Chang et al. | 707/103 |
| 5,918,229 A | 6/1999 | Davis et al. | 707/10 |
| 6,009,266 A * | 12/1999 | Brownell et al. | 709/315 |
| 6,094,664 A * | 7/2000 | Ungar | 707/206 |
| 6,105,040 A * | 8/2000 | Agesen | 707/206 |
| 6,202,208 B1 * | 3/2001 | Holiday, Jr. | 717/11 |
| 6,219,678 B1 * | 4/2001 | Yelland et al. | 707/206 |
| 6,230,159 B1 * | 5/2001 | Golde | 707/103 |
| 6,279,148 B1 * | 8/2001 | Taivalsaari et al. | 717/1 |

* cited by examiner

Primary Examiner—David Hudspeth
Assistant Examiner—Fred F. Tzeng
(74) Attorney, Agent, or Firm—Leslie A. Van Leeuwen; Bracewell & Patterson, L.L.P.

(57) ABSTRACT

A method and system are disclosed for operating an object-oriented environment within a computer system. The execution of the object-oriented environment is initiated. A first memory location is allocated in a memory area within the object-oriented environment for storing an object. A second memory location is allocated in the memory area with the allocation of the first memory location for storing a persistence indicator. The persistence indicator indicates a point during the execution of the object-oriented environment at which the allocation of the first memory location occurred. A total number of bytes of the memory area which had been allocated during the execution of the object-oriented environment when the allocation of the first memory location occurred is stored as the persistence indicator.

32 Claims, 9 Drawing Sheets

METHOD AND SYSTEM FOR ALLOCATION OF A PERSISTENCE INDICATOR FOR AN OBJECT IN AN OBJECT-ORIENTED ENVIRONMENT

BACKGROUND OF THE INVENTION

1. Technical Field

The present invention relates to an improved data processing system and, in particular, to a method and system for optimizing performance of an object-oriented environment in a data processing system. Still more particularly, the present invention provides a method and system in an object-oriented environment for allocating a persistence indicator for an object, where the persistence indicator indicates a point during the execution of the object-oriented environment at which the allocation of memory for the object occurred.

2. Description of Related Art

Effective management and enhancement of data processing systems requires knowing how and when various system resources are being used. An object-oriented environment supported by the Java™ Programming Language available from Sun Microsystems includes a Java virtual machine (JVM). The JVM may allocate memory from a Java heap where the memory heap allocations and deallocations are hidden from the Java programmer. The allocations are performed by the JVM when new objects are specified. The deallocations are done by the JVM asynchronously at garbage collection (GC) time when there are no longer any references to the object. Because these allocations and deallocations are done by the JVM, the Java programmer is usually not aware of the cost associated with the objects created and may not take care to eliminate references to objects that are not required.

In a performance analysis effort with programs written in Java, the utilization of memory can drastically affect performance. The Java language requires the Java Virtual Machine (JVM) to be responsible for the memory management of the memory area called the heap. The heap is a shared memory area from which memory is allocated for objects. The normal method for allowing reuse of memory locations on the heap for objects which are no longer needed is to perform a garbage collection (GC). During the garbage collection, objects are identified which are no longer in use, and the memory locations where these objects were stored is reclaimed. Objects are in use if they are referenced, either directly or indirectly, by other objects. During the garbage collection, objects can be moved or deallocated from the heap. The time required to perform a garbage collection can significantly affect the total sustained performance and response time of the environment. Thus, it is important to understand information related to both short-lived objects and for persistent objects, that is, those objects that persist between garbage collections.

Therefore, it would be advantageous to provide a method and system for allocating a persistence indicator with an object in an object-oriented environment where the persistence indicator indicates a point during the execution of the object-oriented environment at which the allocation of memory for the object occurred.

SUMMARY OF THE INVENTION

A method and system are disclosed for operating an object-oriented environment within a computer system. The execution of the object-oriented environment is initiated. A first memory location is allocated in a memory area within the object-oriented environment for storing an object. A second memory location is allocated in the memory area concurrently with the allocation of the first memory location for storing a persistence indicator. The persistence indicator indicates a point during the execution of the object-oriented environment at which the allocation of the first memory location occurred. A total number of bytes of the memory area which had been allocated during the execution of the object-oriented environment when the allocation of the first memory location occurred is stored as the persistence indicator.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is a method and system in an object-oriented environment for allocating a first memory location for an object, and allocating a second memory location for a persistence indicator. The persistence indicator indicates a point during the execution of the object-oriented environment at which the allocation of the first memory location occurred. Therefore, the persistence indicator is a relative measurement of the length of time, relative to the initialization of the JVM or a reset of the indicator, that the object associated with the indicator has existed.

A bytes-allocated parameter is maintained during execution of the object-oriented environment. This parameter is the current, total number of bytes of memory which have been allocated from a memory area, such as the Java heap. Each time an additional memory location is allocated from the memory area, the bytes-allocated parameter is incremented by the number of bytes allocated for that memory location.

For each object, a first memory location is allocated for storing the object, and a second memory location is allocated for storing the object's persistence indicator. In the preferred embodiment, the persistence indicator for a particular object is the value of the bytes-allocated parameter after the allocation of the first memory location allocated for that object. In this manner, the persistence indicator is an indication of the age of the object using the number of bytes allocated as a relative measurement of age.

By using the total number of bytes allocated when an object is allocated as the measurement of age, a variety of information may be obtained. For example, the relative order of allocation of various objects may be determined. Also, mature objects can be distinguished form recently allocated objects.

Figure 1:
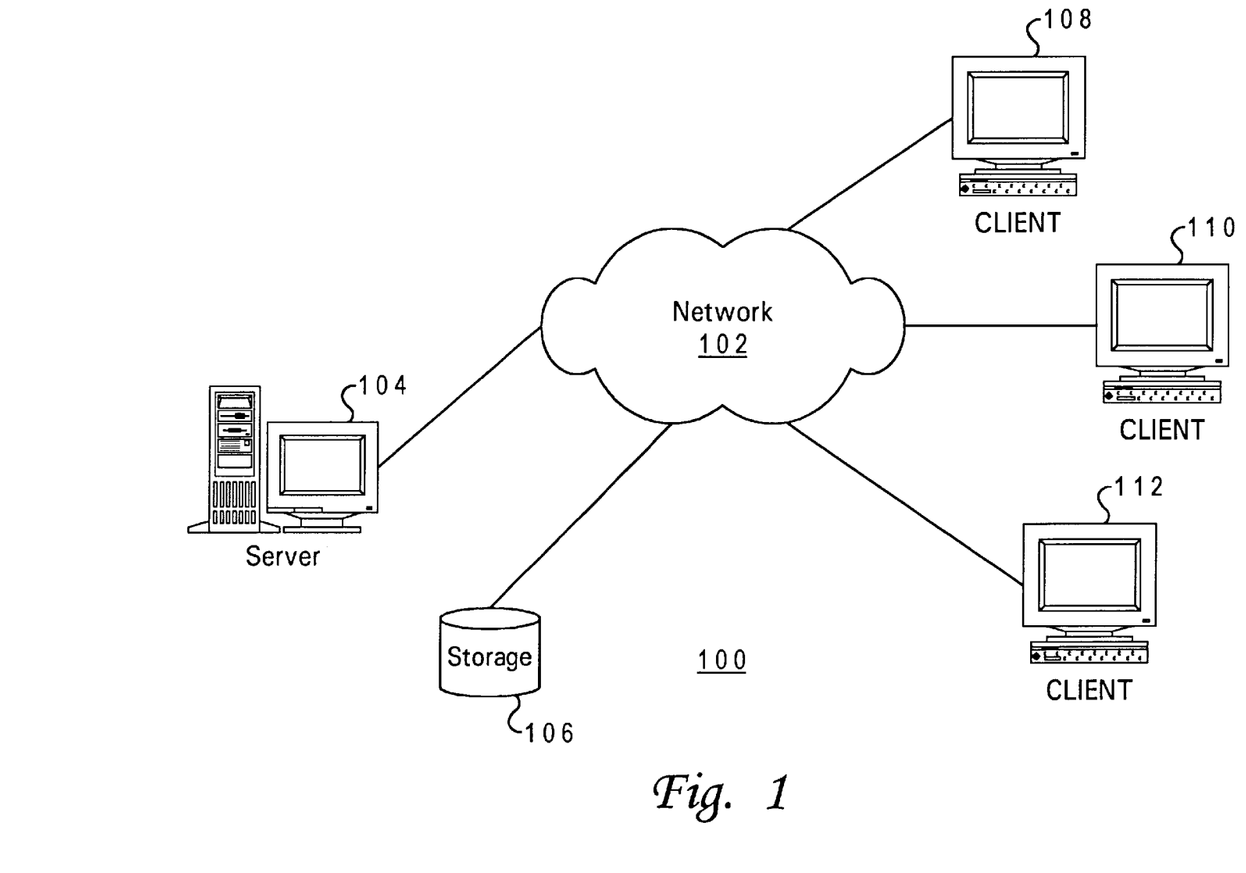
FIG. 1 depicts a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, or other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
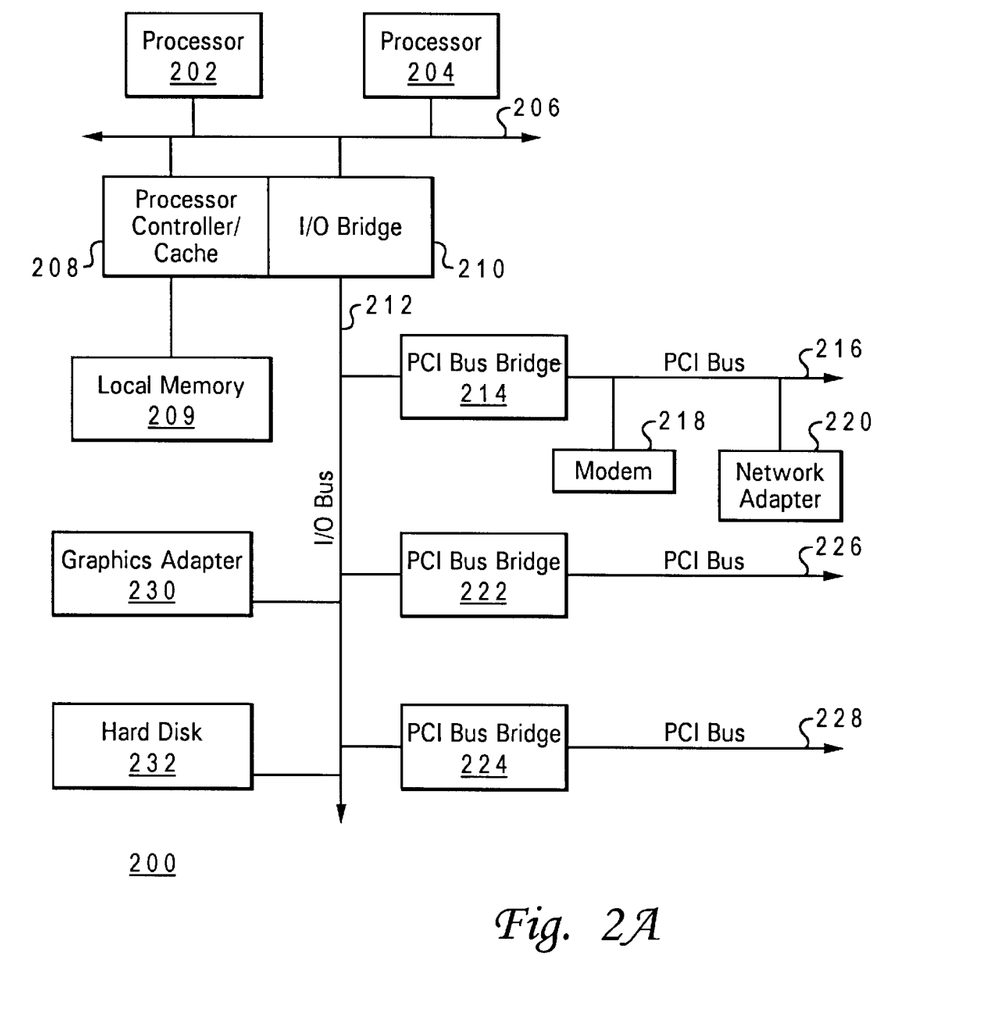
FIGS. 2A–B are block diagrams depicting a data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as an optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
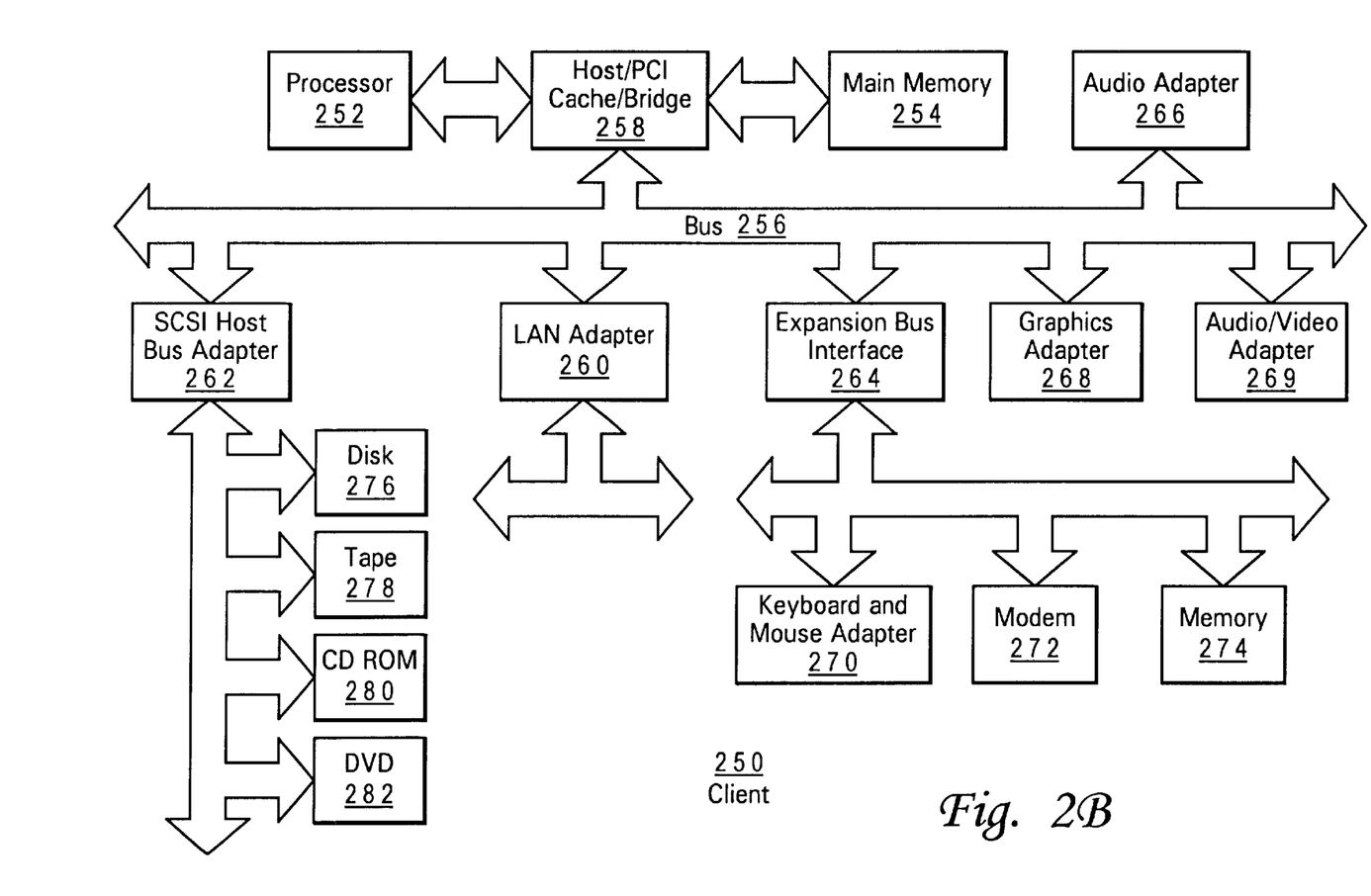

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business or OS/2, which are available from International Business Machines Corporation. JavaOS is loaded from a server on a network to a network client and supports Java programs and applets. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

Figure 3A:
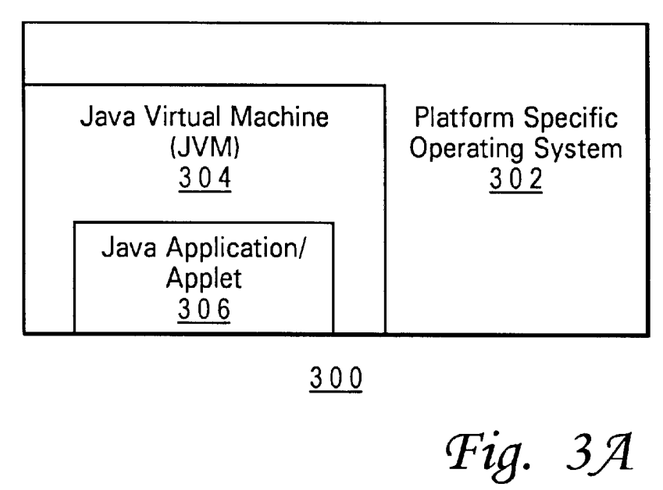
FIG. 3A is a block diagram depicting the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself typically a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated dynamically into native machine code. Bytecodes may be translated into native code by a just-in-time compiler or JIT.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
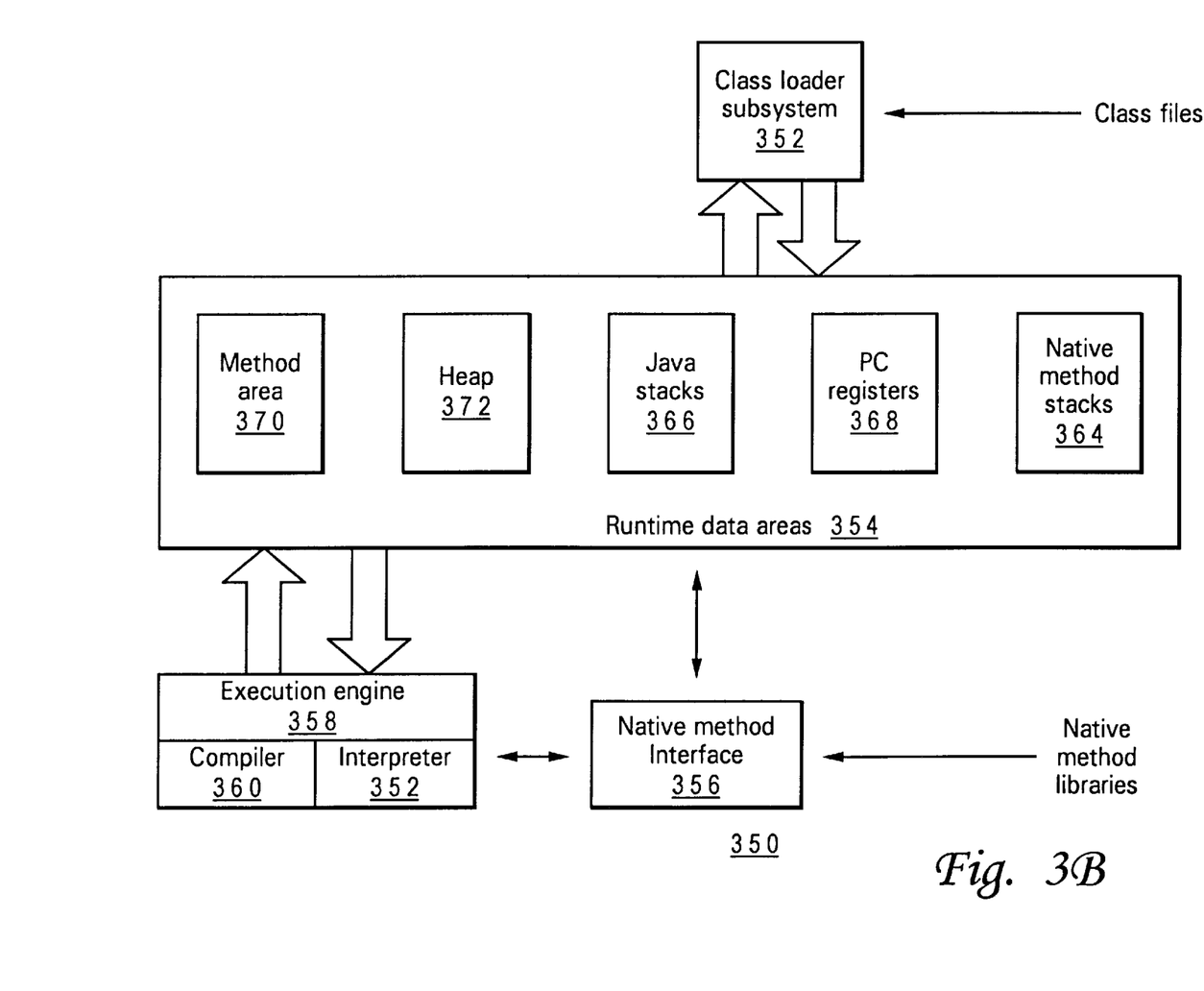
FIG. 3B is a block diagram depicting a Java virtual machine in accordance with a preferred embodiment of the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, and native method interface 358. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Heap 372 is a data area. When objects are allocated, they are placed at a memory location on heap 372.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. JVMs have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory. A memory management unit (not shown) in the depicted example manages memory space within the memory allocated to heap 372. The memory management unit may include an object deallocation service, such as a "garbage collector", which automatically reclaims memory used by objects that are no longer referenced. Additionally, a garbage collector go also may move objects to reduce heap fragmentation.

Figure 4:
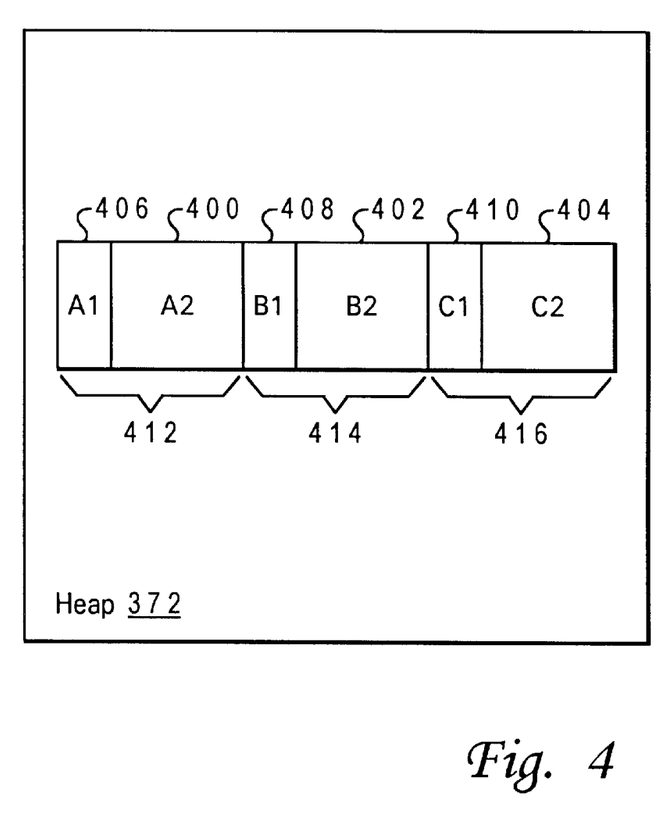
FIG. 4 is a pictorial representation of a data storage area including a plurality of objects and an object persistence indicator associated with each object in accordance with the method and system of the present invention.

FIG. 4 is a pictorial representation of a data storage area including a plurality of objects and an object persistence indicator associated with each object in accordance with the method and system of the present invention. Within heap 372 memory locations are allocated for objects. For example, memory location 400 is allocated for object A2, memory location 402 is allocated for object B2, and memory location 404 is allocated for object C2. When a memory location for an object is allocated, extra storage space within heap 372 is also allocated for storage of the object's persistence indicator. For example, when memory location 400 was allocated for object A2, memory location 406 was allocated for storage of that object's persistence indicator A1. When memory location 402 was allocated for object B2, memory location 408 was allocated for storage of that object's persistence indicator B1. And, when memory location 404 was allocated, memory location 410 was allocated for storage of that object's persistence indicator C1.

When the object deallocation service, or garbage collector, needs to access an object, it will treat the extra storage space associated with that object as part of the object. For example, when the garbage collector determines that object A2 is no longer referenced by another object, the garbage collector will deallocate memory location 400 as well as memory location 406. As another example, the garbage collector may move an object from one memory location to another on the heap 372. When object B2 is moved, the garbage collector will move both memory locations 402 and 408 together. The memory locations for storing the object and its persistence indicator will be treated together as one unit. Therefore, the garbage collector will treat the memory location storing the object and the memory location storing the persistence indicator together.

Figure 5:
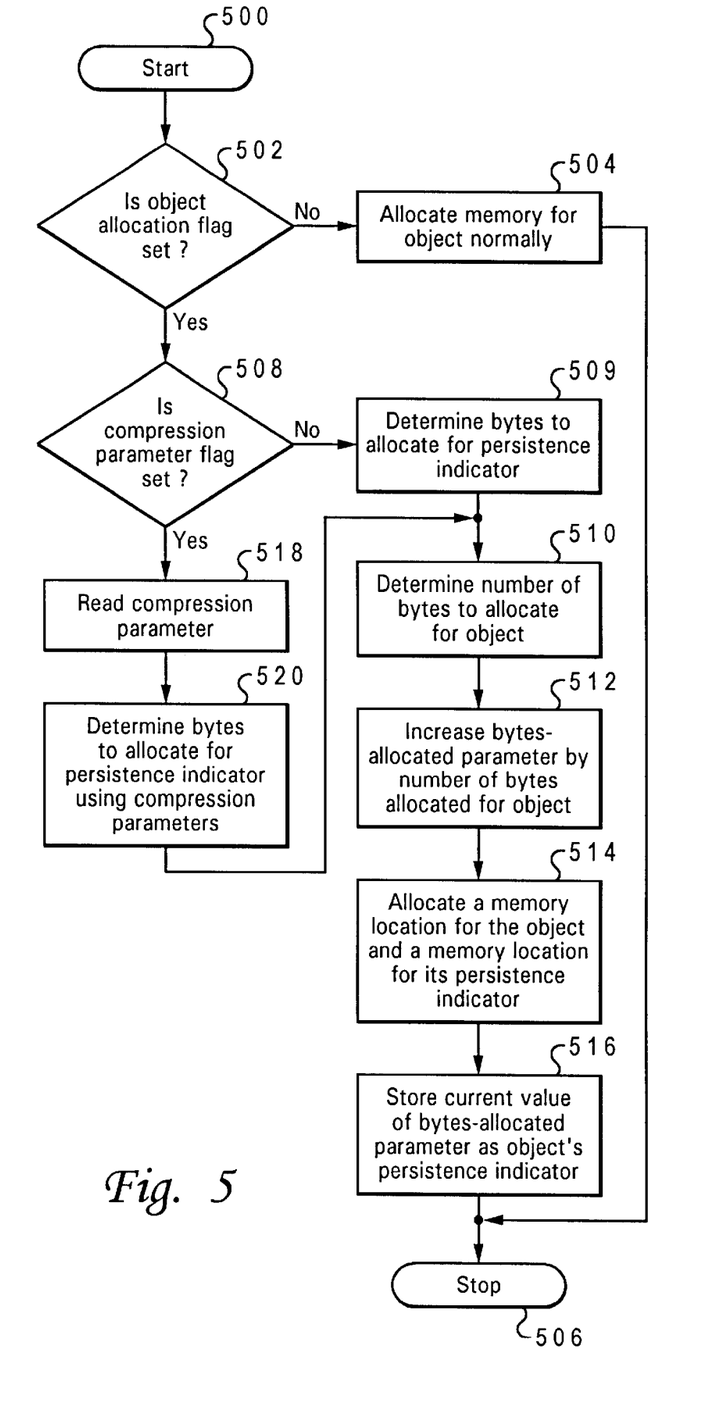
FIG. 5 is a high level flow chart depicting the allocation of a memory location for an object having a persistence indicator in accordance with the method and system of the present invention.

FIG. 5 is a high level flow chart depicting the allocation of a memory location for an object having a persistence indicator in accordance with the method and system of the present invention. The process starts as depicted at block 500 and thereafter passes to block 502 which illustrates a determination of whether or not an object allocation flag, or some other type of indicator, has been set. The object allocation flag, when set, indicates that a memory location for storing a persistence indicator will be allocated along with a memory location allocated for an object. If a determination is made that the object allocation flag is not set, the process passes to block 504 which depicts the allocation of a memory location for storing an object normally in accordance with the prior art. The process then terminates as illustrated at block 506.

Referring again to block 502, if a determination is made that the object allocation flag is set, the process passes to block 508 which illustrates a determination of whether or not the compression flag is set. When the compression flag is set, the persistence indicator will be compressed. A common compression algorithm changes the granularity of the persistence indicator. For example, by dividing by 32, we can reduce the space required for the persistence indicator. If a determination is made that the compression flag is not set, the process passes to block 509 which illustrates determining the numbers of bytes to allocate for the persistence indicator. Here, the compression parameter is not utilized. Next, block 510 which depicts determining the number of bytes to allocate for the storage of the object. Next, block 512 depicts increasing the bytes-allocated parameter by the number of bytes allocated for storage of the object. Thereafter, block 514 illustrates the allocation of a first memory location for the storage of the object and a second memory location for storage of the object's persistence indicator. Next, block 516 depicts the storage of the current value of the bytes-allocated parameter as the object's persistence indicator in the second memory location allocated for this object. The process then terminates as illustrated at block 506.

Referring again to block 508, if a determination is made that the compression flag is set, the process passes block 518 which depicts the reading of the compression parameter. Next, block 520 depicts a determination of the number of bytes to allocate for the persistence indicator utilizing the compression parameter. The process then passes to block 510.

Figures 6, 8:
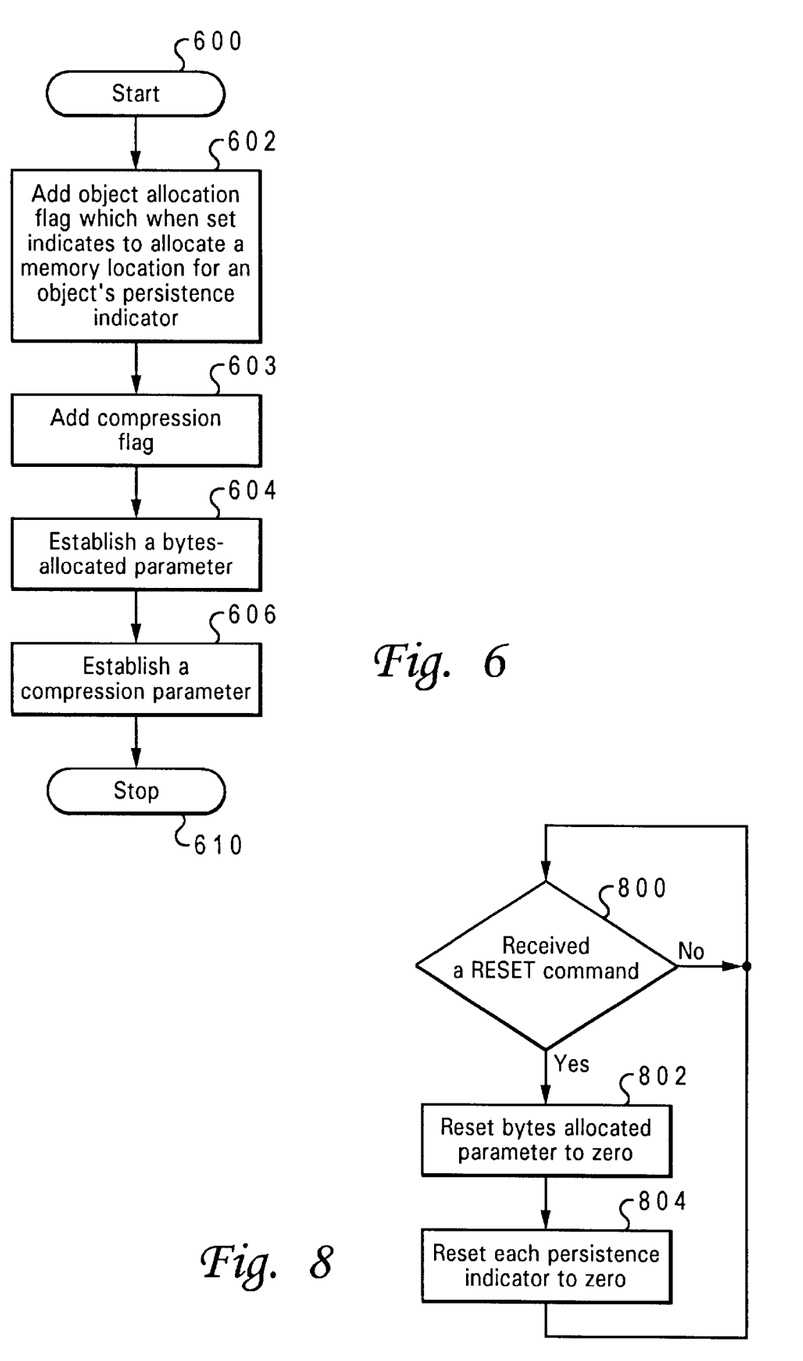
FIG. 6 is a high level flow chart illustrating the modification of a Java Virtual Machine to add a flag to indicate the modification of the object allocation process as depicted in FIG. 5 in accordance with the method and system of the present invention.
FIG. 8 is a high level flow chart illustrating a resetting of a bytes-allocated parameter in accordance with the method and system of the present invention.

FIG. 6 is a high level flow chart illustrating the modification of a Java Virtual Machine to add an object allocation flag to indicate the modification of the object allocation process as depicted in FIG. 5 in accordance with the method and system of the present invention. The process starts as depicted at block 600 and thereafter passes to block 602 which illustrates the addition of an object allocation flag which, when set, indicates that a second memory location will be allocated for storage of a persistence indicator when a first memory location for storage of the object is allocated. The second memory location will store a persistence indicator which is associated with the object. The object definition is, therefore, modified to include the second memory location. Thereafter, block 603 illustrates the addition of a compression flag. Next, block 604 depicts the establishment of a bytes-allocated parameter. The bytes-allocated parameter maintains the current, total number of bytes of memory of the heap which have been allocated.

The process then passes to block 606 which illustrates the establishment of a compression parameter. The process then terminates as illustrated by block 610.

Figure 7:
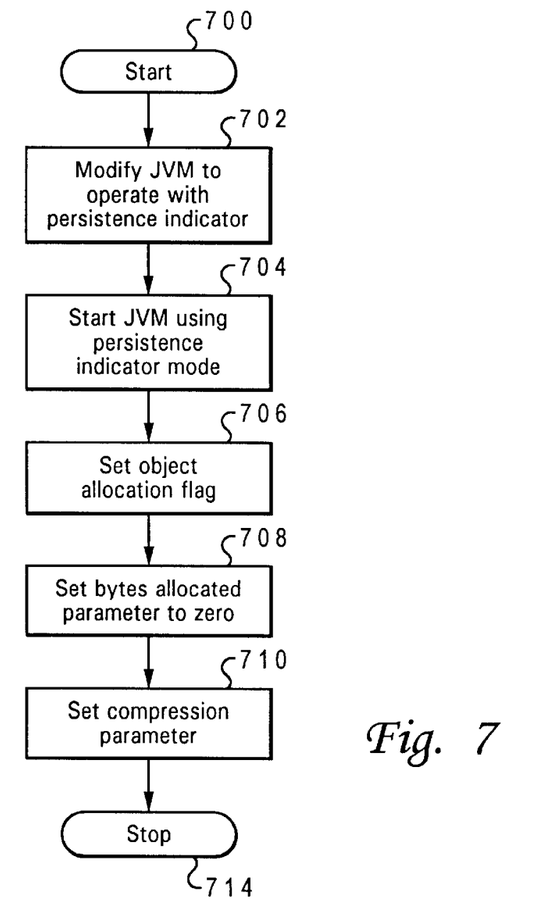
FIG. 7 is a high level flow chart depicting the execution of a Java Virtual Machine in accordance with the method and system of the present invention.

FIG. 7 is a high level flow chart depicting the execution of a Java Virtual Machine in accordance with the method and system of the present invention. The process starts as depicted at block 700 and thereafter passes to block 702 which illustrates a modification of the Java Virtual Machine (JVM) so that the JVM will operate with persistence indicators. Several methods exist for modifying the JVM. For example, the JVM may be modified to accept an extra parameter received from the execution line which indicates persistence indicators will be used. Another method is to modify the JVM to accept an environment variable which indicates that the JVM will operate with persistence indicators. Next, block 704 depicts starting the execution of the JVM using the persistence indicator mode of operation. Thereafter, block 706 illustrates setting the object allocation flag. The process then passes to block 708 which depicts setting the bytes-allocated parameter to a value of zero. Block 710, then, illustrates setting the compression parameter to a value determined by the user. The process then terminates as illustrated by block 714.

FIG. 8 is a high level flow chart illustrating a resetting of a bytes-allocated parameter in accordance with the method and system of the present invention. The process starts as depicted by block 800 which illustrates a determination of whether or not a RESET command has been received by the JVM. If a determination is made that a RESET command has not been received, the process loops back to block 800 until a RESET command is received. When a RESET command is received, the process passes to block 802 which depicts resetting the bytes-allocated parameter to zero. Next, block 804 illustrates resetting each existing persistence indicator to zero. The process then passes back to block 800.

Figure 9:
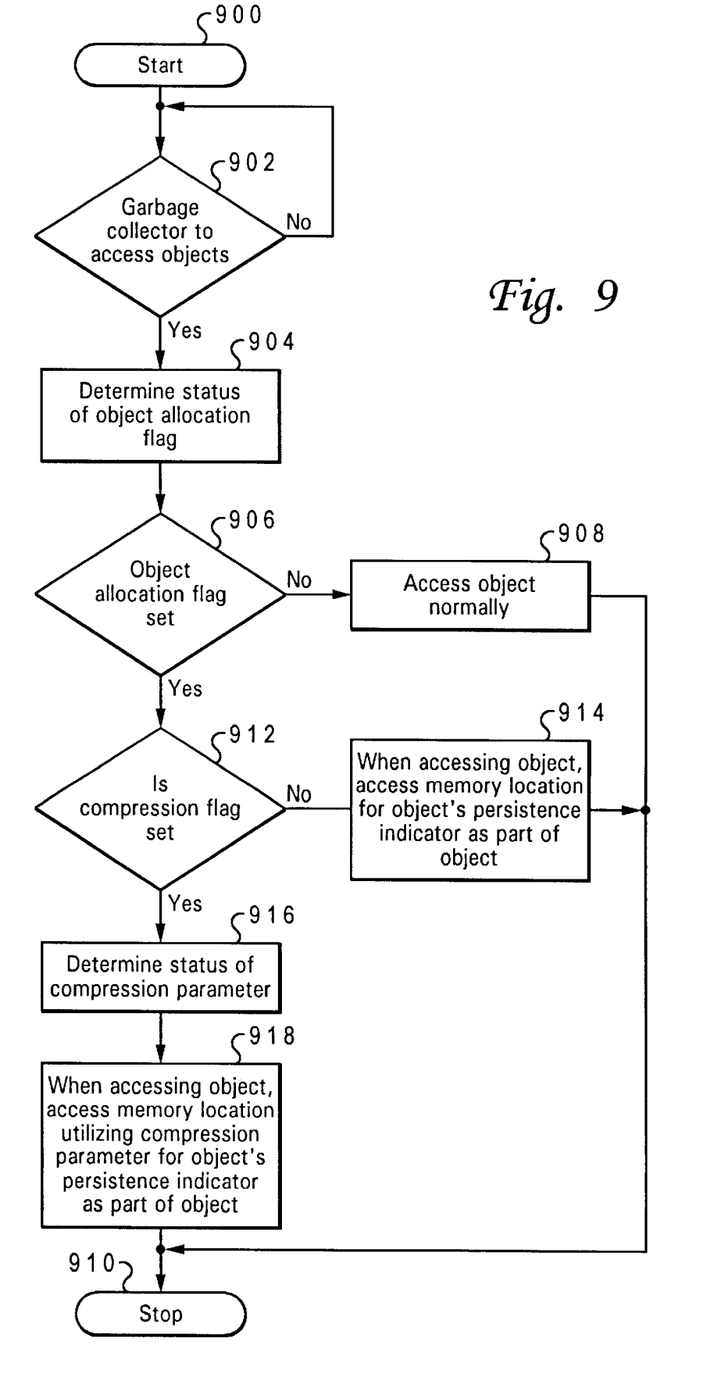
FIG. 9 is a high level flow chart depicting deallocation of a memory location for an object having a persistence indicator in accordance with the method and system of the present invention.

FIG. 9 is a high level flow chart depicting deallocation of a memory location for an object having a persistence indicator in accordance with the method arid system of the present invention. The process starts as depicted by block 900 and thereafter passes to block 902 which illustrates a determination of whether or not an object deallocation service, such as a "garbage collector", needs to access an object. If a detenation is made that an object deallocation service does not need to access an object, the process passes back to block 902. Referring again to block 902, if a determination is made that an object deallocation service needs to access an object, the process passes to block 904 which depicts a determination of the status of an object allocation flag. Block 906, then, illustrates a determination of whether or not the object allocation flag is set. If a determination is made that the object allocation flag is not set, the process passes to block 908 which depicts the object deallocation service accessing the object normally, according to the prior art. The process then terminates as illustrated by block 910.

Referring again to block 906, if a determination is made that the object allocation flag is set, the process passes to block 912 which depicts a determination of whether or not a compression flag has been set. If a determination is made that the compression flag is not set, the process passes to block 914 which illustrates the object deallocation service accessing the second memory location as part of the object. The process then terminates as depicted by block 910.

Referring again to block 912, if a determination is made that the compression flag is set, the process passes to block 916 which illustrates a determination of the value of the compression parameter. Next, block 918 depicts the object deallocation service accessing the extra storage space, which had been allocated and associated with this object, as part of the object. The compression parameter is utilized when accessing the memory location. Thereafter, the process terminates as illustrated at block 910.

Figure 10:
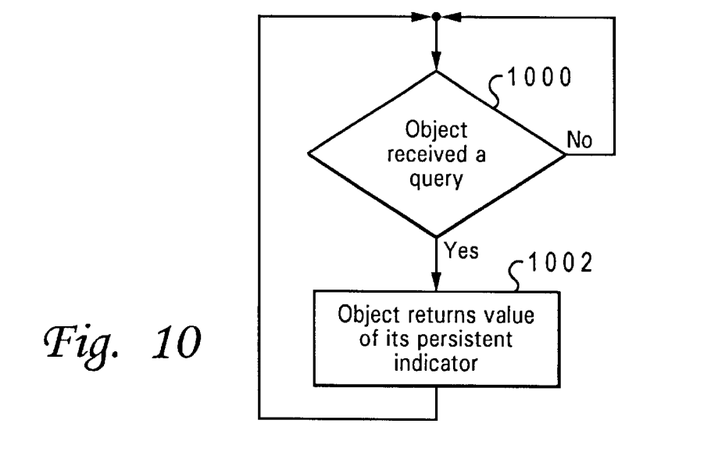
FIG. 10 is a high level flow chart illustrating an object providing its persistence indicator in response to a query in accordance with the method and system of the present invention.

FIG. 10 is a high level flow chart illustrating an object providing its persistence indicator in response to a query in accordance with the method and system of the present invention. The process starts as depicted at block 1000 which illustrates a determination of whether or not an object has been queried for its age. An object may be queried during a persistence indicator mode in order to obtain the object's age. An API call may be made which includes the object's identifier. After receiving the API call, the identified object will return the value of its persistence indicator. If a determination is made that the object has not received such an API call, the process passes to block 1000. Referring again to block 1000, if a determination is made that the object has received such an API call, the process passes to block 1002 which depicts the object returning the value of its associated persistence indicator. The process then passes back to block 1000.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for operating an object-oriented environment within a computer system, said method comprising the steps of:

initiating execution of said object-oriented environment;

allocating a first memory location in a memory area within said object-oriented environment for storing an object; and concurrently allocating a second memory location in said memory area with said allocation of said first memory location for storing a persistence indicator, said persistence indicator indicating a point during said execution of said object-oriented environment at which said allocation of said first memory location occurred.

2. The method according to claim 1, wherein said concurrently allocating step further includes allocating said second memory location during an initial allocation of memory to said object.

3. The method according to claim 1, further comprising the step of establishing a parameter which indicates a current, total number of bytes of said memory area allocated during said execution of said object-oriented environment.

4. The method according to claim 3, further comprising the step of storing said parameter as said persistence indicator in response to said allocation of said first memory location, wherein a value of said parameter includes a number of bytes of memory allocated to said object.

5. The method according to claim 4, further comprising the step of accessing said fist and second memory locations as said object in response to a subsequent command to access said object.

6. The method according to claim 5, further comprising the step of resetting said parameter to zero in response to a reset command.

7. The method according to claim 6, further comprising the step of resetting said persistence indicator in response to said reset command.

8. The method according to claim 1, further comprising the step of allocating said second memory location during said allocation of said first memory location in response to an entry of a persistence indicator mode of operation of said object-oriented environment.

9. The method according to claim 1, further comprising the steps of:
setting a compression flag within said object-oriented environment to indicate that a compression parameter is to be utilized;
responsive to said flag being set, automatically evaluating a compression value of said persistence indicator utilizing said compression parameter; and
allocating said compression value to said second memory location.

10. The method according to claim 9, further comprising the step of allocating said second memory location contiguous to said first memory location in said memory area.

11. The method according to claim 9, further comprising determining a number of bytes to allocate to said persistence indicator, wherein an exact number of bytes is allocated and determined based on whether an actual persistence value is stored or said compression value is stored within said second memory location.

12. The method according to claim 1, further comprising setting an object allocation flag within said object-oriented environment, wherein said object allocation flag indicates that said second memory location is to be concurrently allocated and that subsequent requests for said object be provided with contents of both said first memory location and said second memory location.

13. A computer system including an object-oriented environment, comprising:
means for initiating execution of said object-oriented environment;
means for allocating a first memory location within a memory area within said object-oriented environment for storing an object; and
means for concurrently allocating a second memory location within said memory area with an allocation of said first memory location for storing a persistence indicator, said persistence indicator indicating a point during said execution of said object-oriented environment at which said allocation of said first memory location occurred.

14. The system according to claim 13, wherein said means for concurrently allocating further means for allocating said second memory location during an initial allocation of memory to said object.

15. The system according to claim 14, further comprising means for establishing a parameter which indicates a current, total number of bytes of said memory area allocated during said execution of said object-oriented environment.

16. The system according to claim 13, further comprising means for storing said parameter as said persistence indicator in response to said allocation of said first memory location, wherein a value of said parameter includes a number of bytes of memory allocated to said object.

17. The system according to claim 16, further comprising means for accessing said first and second memory locations as said object in response to a subsequent command to access said object.

18. The system according to claim 17, further comprising means for resetting said parameter to zero in response to a reset command.

19. The system according to claim 18, further comprising means for resetting said persistence indicator in response to said reset command.

20. The system according to claim 19, further comprising:
means for setting a compression flag within said object-oriented environment to indicate that a compression parameter is to be utilized;
means, responsive to said flag being set, for automatically evaluating a compression value of said persistence indicator utilizing said compression parameter; and
means for allocating said compression value to said second memory location.

21. The system according to claim 20, wherein said second memory location is allocated contiguous to said first memory location in said memory area.

22. The computer program product according to claim 20, wherein said instruction means for allocating allocates said second memory location contiguous to said first memory location in said memory area.

23. The system according to claim 13, further comprising said second memory location being allocated during said allocation of said first memory location in response to an entry of a persistence indicator mode of operation of said object-oriented environment.

24. A computer program product for execution within an object-oriented environment on a computer system, said computer program product comprising:
a computer readable medium; and
instruction means on said computer readable medium for initiating execution of said object-oriented environment said instruction means further comprising:
means for allocating a first memory location within a memory area within said object-oriented environment for storing an object; and
means for concurrently allocating a second memory location within said memory area with said allocation of said first memory location for storing a persistence indicator, said persistence indicator indicating a point during said execution of said object-oriented environment at which an allocation of said first memory location occurred.

25. The computer program product according to claim 24, wherein said means for concurrently allocating further includes instruction means for:
allocating said second mernory location during a first allocation of memory to said object; and
linking said second memory location to said first memory location whereby subsequent requests for said object returns contents of both said first memory location and said second memory location.

26. The computer program product according to claim 24, further comprising instruction means for establishing a parameter which indicates a current, total number of bytes of said memory area allocated during said execution of said object-oriented environment.

27. The computer program product according to claim 26, further comprising instruction means for storing said parameter as said persistence indicator in response to said allocation of said first memory location, wherein a value of said parameter includes a number of bytes of memory allocated to said object.

28. The computer program product according to claim 27, further comprising instruction means for accessing said first and second memory locations as said object in response to a subsequent command to access said object.

29. The computer program product according to claim 28, further comprising instruction means for resetting said parameter to zero in response to a reset command.

30. The computer program product according to claim 29, further comprising instruction means for resetting said persistence indicator in response to said reset command.

31. The computer program product according to claim 24, further comprising said second memory location being allocated during said allocation of said first memory location in response to an entry of a persistence indicator mode of operation of said object-oriented enviornment.

32. The computer program product according to claim 24, further comprsing:

instruction means for setting a compression flag within said object-oriented environment to indicate that a compression parameter is to be utilized;

instruction means, responsive to said flag being set, for automatically evaluating a compression value of said persistence indicator utilizing said compression parameter; and instruction means for allocating said compression value to said second memory location.

* * * * *

UNITED STATES PATENT AND TRADEMARK OFFICE
CERTIFICATE OF CORRECTION

PATENT NO.     : 6,457,111 B1
DATED          : September 24, 2002
INVENTOR(S)    : Howard et al.

It is certified that error appears in the above-identified patent and that said Letters Patent is hereby corrected as shown below:

Column 9,
Line 59, please delete "detenation" and replace with -- determination --.

Column 11,
Line 11, please delete "fist" and replace with -- first --.

Column 12,
Line 64, please delete "mernory" and replace with -- memory --.

Signed and Sealed this

Eighth Day of April, 2003

JAMES E. ROGAN
*Director of the United States Patent and Trademark Office*